United States Patent [19]
Hoffmeister et al.

[11] 4,427,382
[45] Jan. 24, 1984

[54] DENTAL EQUIPMENT STAND

[75] Inventors: Jürgen Hoffmeister, Genova-Nervi, Italy; Franz-Xaver Boeckh, Schöneburg, Fed. Rep. of Germany

[73] Assignee: Kaltenbach & Voigt GmbH & Co., Fed. Rep. of Germany

[21] Appl. No.: 354,892

[22] Filed: Mar. 4, 1982

[30] Foreign Application Priority Data

Mar. 13, 1981 [DE] Fed. Rep. of Germany ....... 3109721

[51] Int. Cl.³ .............................................. A61C 1/14
[52] U.S. Cl. ........................................ 433/79; 433/33; 248/280.1; 248/282
[58] Field of Search ................... 433/79, 33; 248/282, 248/280.1, 278, 281.1, 283

[56] References Cited

U.S. PATENT DOCUMENTS

| 641,748 | 1/1900 | Smith | 248/281.1 |
| 1,075,541 | 10/1913 | Browne | 248/281.1 |
| 3,160,379 | 12/1964 | Gardella | 433/79 |
| 3,237,902 | 3/1966 | Hayashi | 433/79 |
| 3,243,497 | 3/1966 | Kendall et al. | 248/282 |
| 3,771,226 | 11/1973 | Lieb et al. | 433/33 |
| 4,026,026 | 5/1977 | Richardson | 433/79 |
| 4,158,490 | 6/1979 | Gottschalk et al. | 248/281.1 |

FOREIGN PATENT DOCUMENTS

| 1294593 | 5/1969 | Fed. Rep. of Germany | 433/79 |
| 607385 | 8/1960 | Italy | 248/278 |

Primary Examiner—John J. Wilson
Attorney, Agent, or Firm—Scully, Scott, Murphy & Presser

[57] ABSTRACT

A dental equipment stand with an adjustable multi-component carrying arm for a dental mounting component, wherein the carrying arm consists of two hingedly interconnected pivot arms, of which the first pivot arm is arranged to be pivotable about a pivot bearing at the end remote from the second pivot arm so as to be pivotable about a horizontal axis. The pivot bearing is, in turn, supported in a carrying component so as to be rotatable about a vertical axis, and in which the second pivot arm at its free end supports the mounting component. The mounting component which is arranged at the free end of the second pivot arm so as to be pivotable can, for example, be a holder for dental instruments, a repository plate with, possibly, a holder located thereon for dental instruments, or the like. The carrying component which includes the pivot bearing can be arranged stationarily or movably on the floor or, for example, as a console on the wall, on the ceiling or on a professional furniture piece, for instance, on a cabinet or on a writing desk.

15 Claims, 7 Drawing Figures

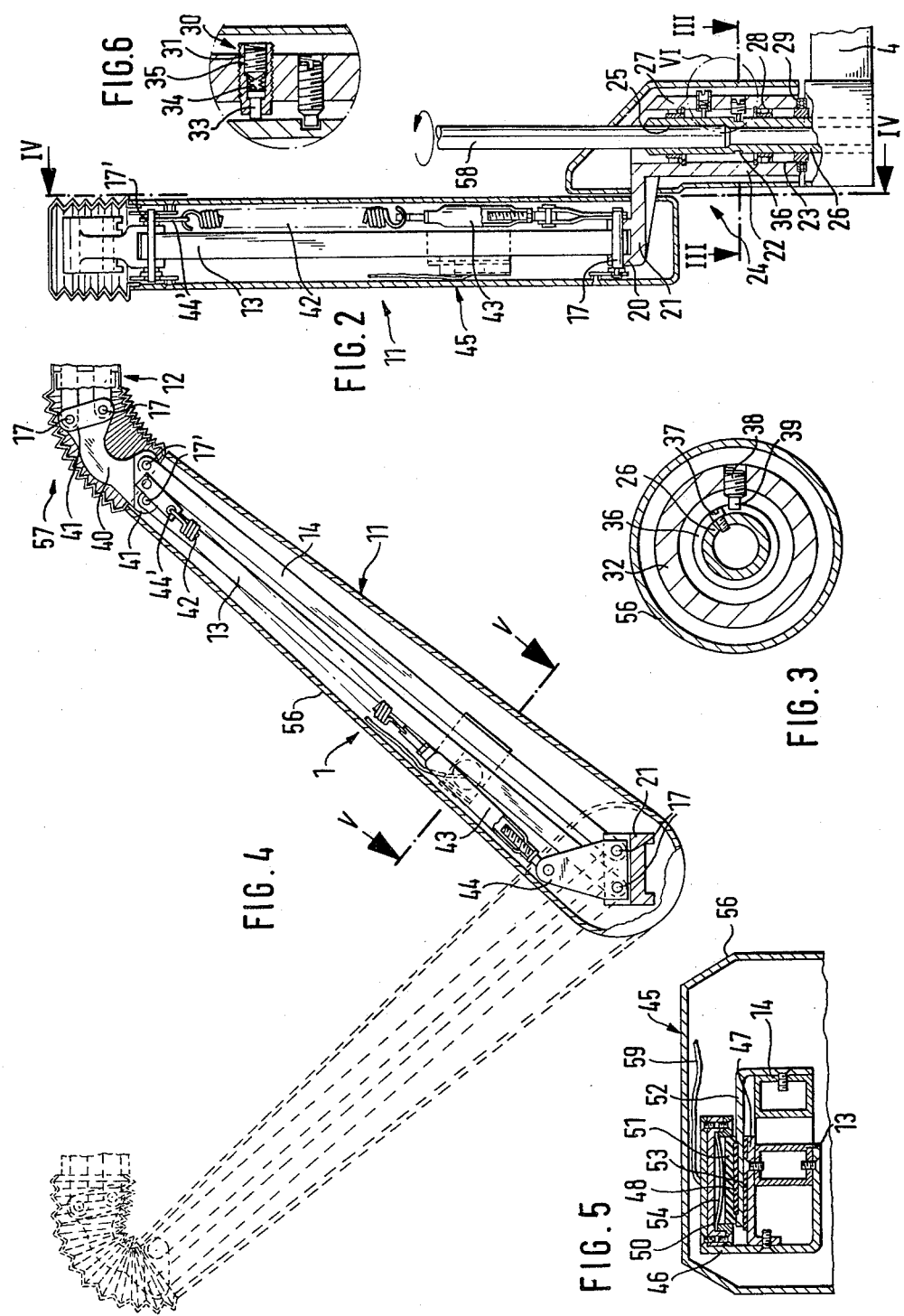

DENTAL EQUIPMENT STAND

BACKGROUND OF THE INVENTION

1. Field of the Invention

The present invention relates to a dental equipment stand with an adjustable multi-component carrying arm for a dental mounting component, wherein the carrying arm consists of two hingedly interconnected pivot arms, of which the first pivot arm is arranged to be pivotable about a pivot bearing at the end remote from the second pivot arm so as to be pivotable about a horizontal axis, and wherein the pivot bearing is, in turn, supported in a carrying component so as to be rotatable about a vertical axis, and in which the second pivot arm at its free end supports the mounting component.

The mounting component which is arranged at the free end of the second pivot arm so as to be pivotable can, for example, be a holder for dental instruments, a repository plate with, possibly, a holder located thereon for dental instruments, or the like. The carrying component which includes the pivot bearing can be arranged stationarily or movably on the floor or, for example, as a console on the wall, on the ceiling or on a professional furniture piece, for instance, on a cabinet or on a writing desk. It is also purposeful when the carrying component, together with the dental treatment chair, are arranged so as to be adjustable in height.

2. Discussion of the Prior Art

In an equipment stand of this type which is described in the sales brochure "Type 101 cc and 102 cc", issued by the firm A/S Flex Dental, the rear or the lower of two linked articulated pivot arms representing linkage parallelograms are pivotably supported on a pivot bearing of a switch-and equipment housing which rests on the floor. In order to be able to bring the repository plate which forms the mounting component for the treating dentist, which is arranged at the free end of the carrying arm, into the correct position in proximity to the patient, in the known equipment stands for the carrying arm there is required a relatively large number, for example, six hinged joints. Independent of the fact that such a carrying arm is extremely complex and thereby expensive, it is difficult to manipulate by hand from the repository plate, inasmuch as due to the numerous hinged joints the current position of the pivot arms is overcompensated for and, therefore, it is not predictable which position the pivot arms will assume during and after a change in the location of the repository plate. As a result, for the pivot arms there is required a wide, and its scope not predictable, range of action. In addition thereto, in that during the movement of the repository plate there will be set constantly varying lengths of the lever arm, so that the forces which are also required for the movement of the plate will continually change in magnitude and direction. Since a large number of joints are present on the carrying arm, and all supply conduits which are located in hoses must pass through these joints, the hoses are subjected to considerable wear due to buckling and friction.

SUMMARY OF THE INVENTION

Accordingly, in order to obviate or ameliorate the disadvantages encountered in the prior art, pursuant to the present invention there is contemplated the provision of an equipment stand of the above-mentioned type which incorporates considerably fewer joint locations, and allows for predetermined, positively guided and linear movements of the pivot arms with a constant remaining requirement of force.

The advantages which are achieved by the present invention can essentially be ascertained in that there is now facilitated a linear energy-saving movement of the pivot arms of the carrying arm which is correlated with the sequence of movement of the doctor at a necessary change in position of the mounting component, and wherein through a reduction in the joints, the moving sequences of the carrying arm are, in overall, much easier and much more precisely predictably effectuated, and the appearances of wear on and in the supply hose are significantly reduced.

BRIEF DESCRIPTION OF THE DRAWINGS

Reference may now be had to the following detailed description of exemplary embodiments of the invention, taken in conjunction with the accompanying drawings; in which:

FIG. 2 illustrates a side elevational view of a portion of the carrying arm of the equipment stand together with the lower pivot bearing of the first pivot arm, with the last-mentioned shown in section;

FIG. 3 illustrates a sectional view through an enlarged scale illustration of a swing limiting arrangement for the lower pivot bearing, taken along line III—III in FIG. 2;

FIG. 4 illustrates a side elevational view of the first pivot arm of the carrying arm, shown with cut-open casing, taken along line IV—IV in FIG. 2, illustrated in two pivoted positions;

FIG. 5 illustrates a pneumatic brake for the guide arms of the first pivot arm in an enlarged scale sectional view taken along line V—V in FIG. 4;

FIG. 6 illustrates a fragmentary detail of the pivot bearing in accordance with the encircled section VI shown in FIG. 2.

DETAILED DESCRIPTION

Figure 1:
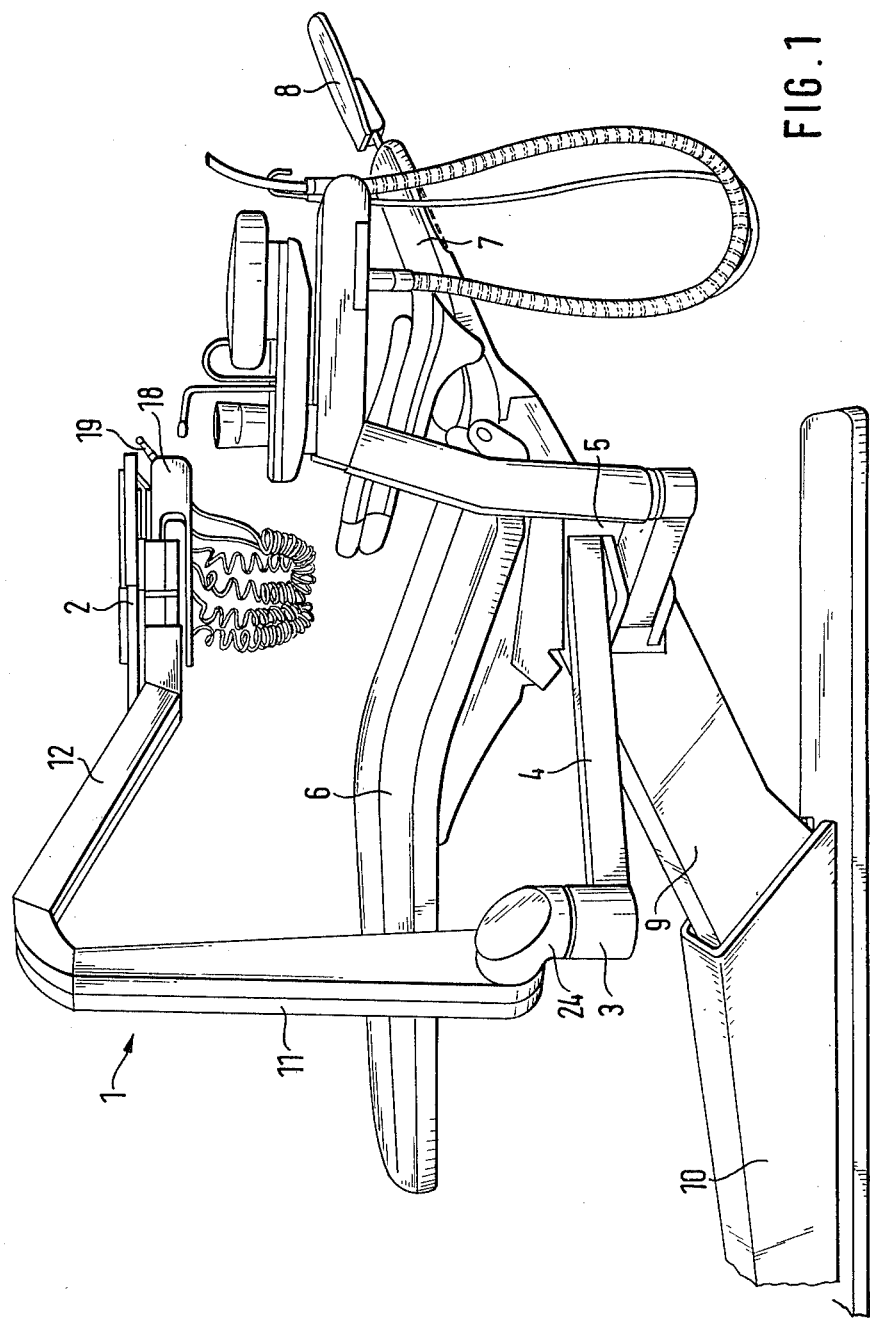
FIG. 1 illustrates a perspective representation of a dental treatment chair combined with the novel equipment stand pursuant to the invention.

As illustrated in FIG. 1, the adjustable multi-component carrying arm 1, which forms the equipment stand, for the instrument repository plate forming the mounting component 2 is pivotably supported on the carrying part 3 of an extension arm 4 which is fastened to the height-adjustable seat support 5 of a dental treatment chair. This known treatment chair consists of a seat 6, which concurrently contains the lower reposing surface and the foot rest, and to which there is linked the backrest 7 together with the head support 8. The seat 6 is arranged on the seat support 5, which stands in connection with the chair pedestal 10 through a chair support 9.

The actual carrying arm 1 consists of two hingedly interconnected pivot arms 11 and 12. Both pivot arms 11 and 12 are each formed of two mutually parallel arranged guide arms 13, 14 and 15, 16 which are held at their ends in horizontal linkage axes 17, 17' at a spacing from each other so as to represent two mutually interconnected linkage parallelograms. The lower linkage axes 17 of the guide arm pair 13, 14 are supported in the support side walls 20 of a carrying console 21, which forms the shorter horizontal portion of an L-shaped carrying linkage 27, whose upright standing lengthier portion 22 is cylindrically constructed, and includes a central bore 23. This component which is, in general, designated as the pivot bearing 24 is with its bore 23 mounted on an axle 26 having a central bore 25, which in turn is fixedly arranged with the above-mentioned bore 23 extending downwardly out of the end of the carrying linkage 27, in the support part 3 of a horizontal extension arm 4. This extension arm 4 is fastened at its other end on the seat support 5.

In order to ensure the easy pivotability of the L-shaped carrying linkage 27 about the hollow axle 26, both parts 26 and 27 are arranged at a distance to each other. In the thereby formed interspace there are provided at least two radial bearings 28, and at the end surface of the carrying linkage 27 and the support part 3 of the extension arm 4 there is provided an axial bearing 29, which can suitably be formed by ball bearings. During the treatment of the patient it is, however, occasionally necessary that this easy pivotability be adjustably restricted. For this purpose, arranged on the carrying linkage 27 is a hollow threaded bolt 31 which acts as a brake 30, and as is ascertained from FIG. 6, can be screwed into the wall 32 of the carrying linkage 27 and, interiorly contains in an axially displaceable manner a bolt 33 which, with interposition of a spring 34, can be pressed by means of a threaded pin 35 against the cylindrical surface of the lengthier part 22 of the carrying linkage 27.

Since the supply conduits 60 are conducted through the pivot bearing 24 it is necessary to prevent the unrestricted rotation of the pivot bearing 24. In order to now predetermine the pivoting range of this bearing 24, an annular groove 36 is formed in exterior of the hollow axle 26, which is at one location interrupted by protruding pin 37, in essence, a screw, and in which, as can be further ascertained from FIGS. 3 and 6, there engages the forward projection of a threaded pin 38 which can be screwed through the wall 32 of the lengthier part 22 of the carrying linkage 27, which during the pivoting movement of the pivot bearing 24 contacts against the screw 37 as a stop.

Figure 7:
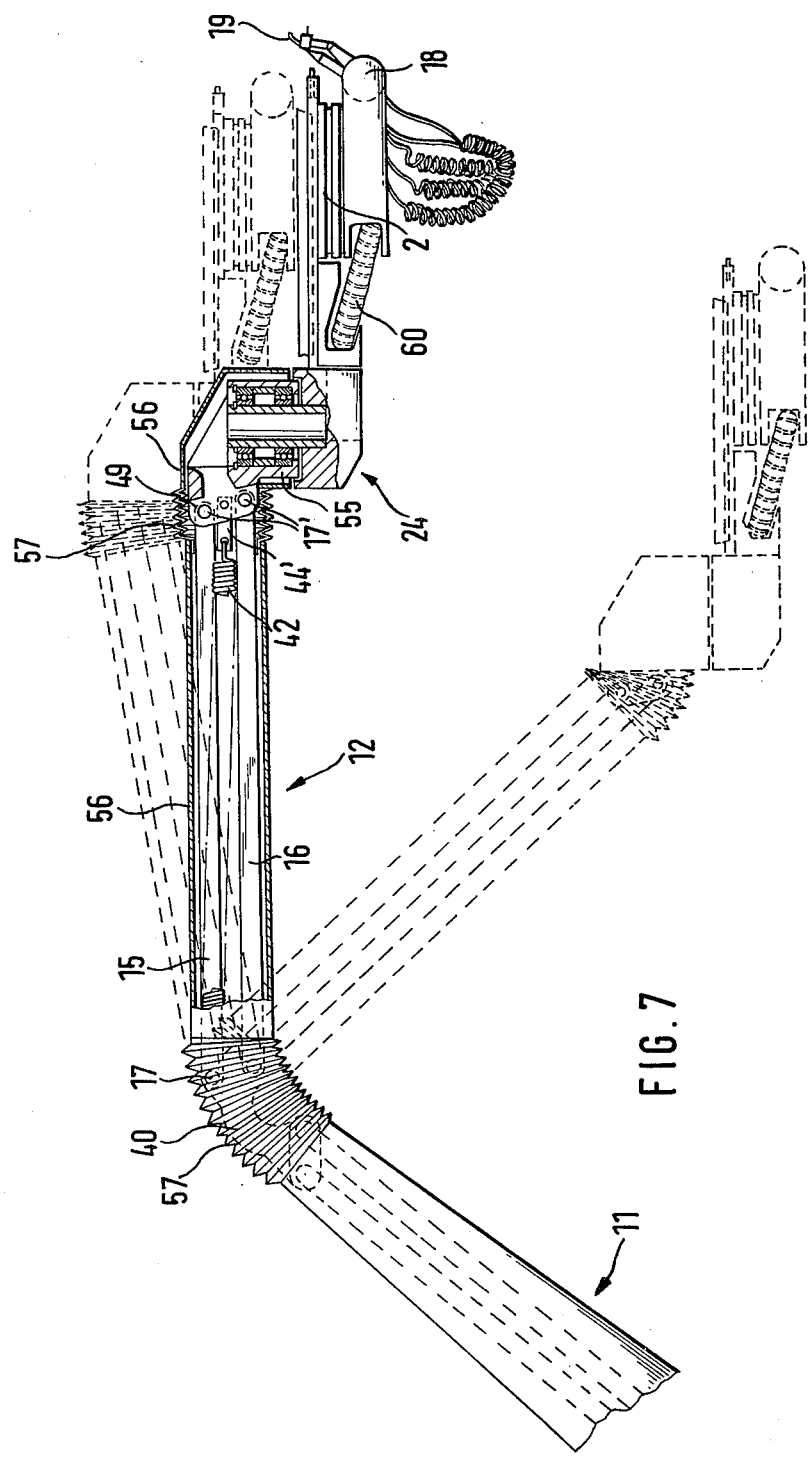
FIG. 7 illustrates a side elevational view of the first and second pivot arm, the intermediate joint member, the headpiece of the second pivot arm and the repository plate which is articulated thereto and which forms the mounting component, inclusive of the holders for the instruments, with cut-open covering and in different pivoted positions of the second swing arm.

The guide arms 13 and 14 of the first pivot arm 11, which illustrated in FIGS. 2 and 4, are arranged with their upper linkage axes 17' in an arcuate intermediate section 40 serving as a hinge joint, at the other side of which there are held the left linkage axes 17 of the guide arms 15 and 16 of the second pivot arm 12 which is illustrated in FIG. 7. In order to form the contemplated linkage parallelogram for the first pivot arm 11 as well as for the second pivot arm 12, the intermediate section 40 includes at its respective ends the narrower side of the widening 41 forming the parallelogram, which represent the support locations of the linkage axes 17, 17'.

For the stabilization and balancing out of the equilibrium of the linkage parallelogram, as well as the first and second pivot arms 11 and 12, there is presently stressed a spring 42 between the hinge locations of the guide arm 13, 14 and 15 and 16, which is formed as a coiled tension spring, wherein the fastening locations of the coil spring 42 find themselves exteriorly of the linkage locations of the guide arms 13 through 16 formed through the linkage axes 17, 17'. At the first pivot arm this is effected in that, as can be ascertained from FIG. 4, the lower end of the coil spring 42 with the interposition of an arrangement 43 for varying the tensile force of the coil spring 42, is fastened to the upper end of a three-cornered shackle 44 which, in turn, is held symmetrically to the projecting ends of the lower horizontal linkage axis 17 projecting above the support side walls 20 of the carrying linkage 27, and wherein the upper end of the coil spring 42 is fastened to a shackle 44' which is hinged between the upper linkage axes 17'; to the lower widening 41 of the arcuate intermediate link section 40. For the remainder, the arrangement is so designed that at a perpendicular position of the pivot arm, the arm and the coil spring extend in parallel to each other. Created thereby is an optimum force relationship, and the first pivot arm 11 can be moved symmetrically towards both sides, in effect, either forwardly and rearwardly.

In order to be able to maintain for a predetermined treatment of the patient a one-time assumed angular position of the pivot arms 11 and 12 relative to each other, a brake 45 is fastened to the guide arms 13 and 14 of the first pivot arm 11, by means of which there can be prevented any relative displacement between the guide arms 13 and 14. The brake 45 can be a magnetic brake. In the embodiment according to FIG. 5, this relates to a pneumatic brake 45 which consists of a U-shaped angle member 46 with an intermediate wall 47 arranged between the arms of the angle member 46. This intermediate wall is hereby so arranged that it and one arm of the U-shaped angle member 46 encompass the one guide arm 13 and are screwed together therewith. Fastened interiorly on the other arm of the U-shaped intermediate member 46 is the brake cylinder 50 of the pneumatic brake 45, which acts through a piston 51 provided with a brake lining 45 on the sliding angle member 52 which is rigidly connected with the other guide arm 14, and thereby presses the free arm against the brake lining 53 which is fastened to the intermediate wall 47. In order to prevent an undesired egress of the compressed air from the brake cylinder 50, the actual cylinder space is sealed off at the side of the piston by means of a clamped in expandable membrane 54 which, in turn, is pressed against the piston 51 under the effect of the compressed air. The pneumatic brake 45 is connected to a compressed air source (not shown), in whose conduit 59 leading to the brake 45 there is arranged, in proximity to the mounting component 2, an also not shown illustrated three-way valve by means of which can be effectuated the setting under sub-pressure or the venting of the brake 45.

Located at the free end of the second pivot arm, referring herewith to FIG. 7, is a headpiece 55 concurrently incorporating the support side walls 49 for the right horizontal linkage axes 17' of the guide arms 15 and 16, on which there is also held, so as to be rotatable about a horizontal axis, the repository plate forming the mounting component 2 including the holder 18 for the instruments 19.

From FIG. 1 through 5 and 7 there can be ascertained that the pivot arms 11 and 12 of the pivot bearing 24 and the headpiece 55 are each encompassed by a sheet metal cladding 56, and that the joint forming the arcuate intermediate member 40 and the connecting location of the second pivot arm 12 to the headpiece 55 are each encompassed by a cylindrical bellows 57, which respectively connect to the claddings 56.

The bore 25 in the hollow axle 26 for the carrying linkage 27 can be concurrently utilized for receiving of a support rod 58 on which can be applied, in a not herein illustrated manner, further arm system, for example, for the support of lamps or the like.

What is claimed is:

1. In a dental equipment stand, an adjustable multi-component carrying arm for supporting and positioning dental equipment, said arm and stand comprising:
   (a) an L-shaped carrying means for supporting said arm, said carrying means providing a first vertical axis for rotation of said arm about a first circumferential path and a second axis for rotation of said arm along a portion of a second circumferential path,
   (b) first and second pivot arms joined together by a single piece arcuate link member, said first pivot arm being pivotably mounted on said L-shaped carrying means to pivot about said second axis and to tranverse said first circumferential path, said second pivot arm being mounted on said single piece arcuate link member, said single link member also defining a first spring shackle,
   (c) said first pivot arm defining a first pair of substantially parallel guide arms and said second pivot arm defining a second pair of substantially parallel guide arms, with said single arcuate link member effecting articulation from said first pair of guide arms to said second pair of guide arms,
   (d) said L-shaped carrying means providing first and second spaced apart pivot points for supporting the first pair of guide arms, said L-shaped means also defining a second spring shackle mounted above the pivot points for said second pair of guide arms, with an adjustable spring means joining said first and second shackle to resiliently offset the weight of said guide arms and said headpiece,
   (e) said second pair of guide arms terminating in a headpiece having first and second spaced apart pivot points for securing the second pair of guide arms,
   (f) said headpiece supporting said dental equipment.

2. An equipment stand as claimed in cliam 1 wherein said L-shaped carrying means is supported along a longer cylindrical portion thereof by at least two spaced radial bearings along the first vertical axis for rotation, and being supported by an axial bearing on an extension arm support member.

3. An equipment stand as claimed in claim 2, wherein said radial bearings and said axial bearing each comprise ball bearings.

4. An equipment stand as claimed in claim 1 or 2, comprising a hollow bolt inserted in a wall of the vertical portion of said L-shaped carrying means; a bolt arranged within said hollow bolt; a spring and a threaded pin acting as a counter bearing on said spring for resiliently pressing said bolt against the cylindrical surface of said carrying means.

5. An equipment stand as claimed in claim 4, wherein a vertical cylindrical portion is supported by a vertical axle, said axle including an annular groove, a protruding pin interrupting said groove at one location; and a threaded pin screwed through the wall of the cylindrical portion of the carrying means having a forward extension that engages said groove.

6. An equipment stand as claimed in claim 5, wherein said vertical axle is hollow, and includes a support rod for the retention of lamps and the like which is insertable into the bore of said axle.

7. In a dental equipment stand, an adjustable multi-component carrying arm for supporting and positioning dental equipment, said arm and stand comprising:
   (a) An L-shaped carrying means having a vertical cylindrical portion supported by a vertical axle with at least two spaced radial bearings therebetween, said carrying means being supported for rotation about said axle by an axial bearing carried by a chair support member,
   (b) first and second pivot arms joined together by an intermediate link member, said first pivot arm being pivotably mounted on said L-shaped carrying means, said second pivot arm being mounted on said intermediate link member,
   (c) each of said pivot arms having a pair of substantially parallel guide arms spaced from one another, with said intermediate link member effecting articulation from said first pair of guide arms to said second pair of guide arms.
   (d) said L-shaped carrying means providing first and second spaced apart pivot points for supporting the first pair of guide arms.
   (e) said second pivot arm supporting said dental equipment for positioning about each of the pivotal axes.

8. An equipment stand as claimed in claim 7, which further comprises a spring means interposed between the two pairs of horizontal linkage axes of the first pair of guide arms, said spring having the lower end thereof fastened to the upper end of a first shackle, said first shackle being a bracket means that projects beyond the spaced apart pivot points of the carrying means, said spring being retained at its upper end to a second shackle which is mounted between the two upper linkage arms and secured to the single arcuate link member.

9. An equipment stand as claimed in claim 8, wherein said spring means is a coil spring; and includes means for varying the tensile force of said coil spring connected between the lower end of said spring and said first shackle.

10. An equipment stand as claimed in claim 1 or 7, which further comprises brake means on the guide arms of said first pivot arm adapted to be actuated to prevent relative displacement between said guide arms.

11. An equipment stand as claimed in claim 10, wherein said brake means comprising a pneumatic brake including a U-shaped angle member and an intermediate wall attached thereto, said brake being fastened to one of said guide arms between the intermediate wall and one arm of said angle member, said brake having a brake cylinder fastened to the other arm of said angle member, said brake cylinder including a piston acting on a sliding angle section fixedly connected with the other guide arm, said sliding angle section being pressed against the brake lining arranged on the intermediate wall.

12. An equipment stand as claimed in claim 1 or 7, wherein said headpiece further includes support side walls for a horizontal linkage axis, said dental equipment being supported on said headpiece for pivotal movement about a vertical axis.

13. An equipment stand as claimed in claim 12, which further comprises a bellows encompassing said pivot arms in the region of the single arcuate link member and the pivotal points of said headpiece; said arms also including a covering on said pivot arms and the supports therefore.

14. An equipment stand as claimed in claim 13, comprising a covering encompassing said L-shaped carrying means.

15. An equipment stand as claimed in claim 1 or 7 wherein said stand further comprises an extension arm having a support portion, and said L-shaped carrying means also defines a vertical axle fastened in said support portion, said extension arm being connected to a height-adjustable part of a treatment chair.

* * * * *